US009825679B2

United States Patent
Kim et al.

(10) Patent No.: US 9,825,679 B2
(45) Date of Patent: Nov. 21, 2017

(54) HYBRID-BEAMFORMING METHOD AND DEVICE FOR SUPPORTING MULTI-RANKS IN WIRELESS ACCESS SYSTEM

(71) Applicant: LG ELECTRONICS INC., Seoul (KR)

(72) Inventors: Kitae Kim, Seoul (KR); Jiwon Kang, Seoul (KR); Kilbom Lee, Seoul (KR); Heejin Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 15/325,067

(22) PCT Filed: Jun. 30, 2015

(86) PCT No.: PCT/KR2015/006712
§ 371 (c)(1),
(2) Date: Jan. 9, 2017

(87) PCT Pub. No.: WO2016/010286
PCT Pub. Date: Jan. 21, 2016

(65) Prior Publication Data
US 2017/0163326 A1 Jun. 8, 2017

Related U.S. Application Data

(60) Provisional application No. 62/025,504, filed on Jul. 17, 2014.

(51) Int. Cl.
*H04L 27/00* (2006.01)
*H04B 7/06* (2006.01)
*H04W 52/02* (2009.01)

(52) U.S. Cl.
CPC ......... *H04B 7/0617* (2013.01); *H04B 7/0639* (2013.01); *H04W 52/0206* (2013.01)

(58) Field of Classification Search
CPC .. H04B 7/0617; H04B 7/0639; H04B 7/0456; H04B 7/0689; H04W 52/0206
See application file for complete search history.

(56) References Cited

U.S. PATENT DOCUMENTS

2010/0189055 A1* 7/2010 Ylitalo ............... H01Q 3/26
370/329
2012/0033761 A1 2/2012 Guo et al.
(Continued)

FOREIGN PATENT DOCUMENTS

KR 1020130017572 2/2013
KR 1020140000174 1/2014

OTHER PUBLICATIONS

N. Li, Z. Wei, J. Geng, L. Sang and D. Yang, "Multiuser hybrid beamforming for max-min SINR problem under 60 GHz wireless channel," 2014 IEEE 25th Annual International Symposium on Personal, Indoor, and Mobile Radio Communication (PIMRC), Washington DC, 2014, pp. 123-128.*
(Continued)

*Primary Examiner* — Daniel Washburn
*Assistant Examiner* — Amneet Singh
(74) *Attorney, Agent, or Firm* — Lee, Hong, Degerman, Kang & Waimey PC

(57) ABSTRACT

The present invention provides a hybrid-beamforming method for supporting multi-ranks, a beam estimation method and devices for supporting the methods. A hybrid-beamforming performance method for supporting multi-ranks in a wireless access system, according to one embodiment of the present invention, can comprise the steps of: detecting, by a transmission end, at least two analog beam candidates having a channel gain greater than or equal to a reference value; pre-compensating analog beam coefficients for at least two analog beam candidates such that one analog beam among the at least two analog beam candidates
(Continued)

includes at least two digital beams; resetting digital PMI coefficient values for at least two digital beams so as to reflect the pre-compensated analog beam coefficients; and transmitting a multi-rank signal by using the pre-compensated analog beam coefficients and the reset digital PMI coefficient values. At this time, analog beamforming and digital beamforming are combined such that hybrid-beamforming can be performed.

9 Claims, 13 Drawing Sheets

(56) References Cited

U.S. PATENT DOCUMENTS

2013/0039401 A1  2/2013  Han et al.
2013/0301454 A1  11/2013  Seol et al.
2014/0334566 A1* 11/2014  Kim ............... H04B 7/0469
                                            375/267

OTHER PUBLICATIONS

C. Kim, T. Kim and J. Y. Seol, "Multi-beam transmission diversity with hybrid beamforming for MIMO-OFDM systems," 2013 IEEE Globecom Workshops (GC Wkshps), Atlanta, GA, 2013, pp. 61-65.*
S. H. Wu, L. K. Chiu, K. Y. Lin and T. H. Chang, "Robust Hybrid Beamforming with Phased Antenna Arrays for Downlink SDMA in Indoor 60 GHz Channels," in IEEE Transactions on Wireless Communications, vol. 12, No. 9, pp. 4542-4557, Sep. 2013.*
PCT International Application No. PCT/KR2015/006712, Written Opinion of the International Searching Authority dated Oct. 21, 2015, 16 pages.

* cited by examiner

FIGURE 17

$$\text{PMI\#1} = \mathbf{v}_1 = \begin{bmatrix} v_1 \\ v_2 \\ v_3 \\ v_4 \end{bmatrix} = \begin{bmatrix} 1 \\ e^{j\pi \cdot 4 \cdot 1 \cdot \sin(45°)} \\ e^{j\pi \cdot 4 \cdot 2 \cdot \sin(45°)} \\ e^{j\pi \cdot 4 \cdot 3 \cdot \sin(45°)} \end{bmatrix} \oplus \begin{bmatrix} 1 \\ e^{-j\pi \cdot 4 \cdot 1 \cdot \sin(55°)} \\ e^{-j\pi \cdot 4 \cdot 2 \cdot \sin(55°)} \\ e^{-j\pi \cdot 4 \cdot 3 \cdot \sin(55°)} \end{bmatrix}$$

$$\text{PMI\#2} = \mathbf{v}_2 = \begin{bmatrix} v_1 \\ v_2 \\ v_3 \\ v_4 \end{bmatrix} = \begin{bmatrix} 1 \\ e^{j\pi \cdot 4 \cdot 1 \cdot \sin(45°)} \\ e^{j\pi \cdot 4 \cdot 2 \cdot \sin(45°)} \\ e^{j\pi \cdot 4 \cdot 3 \cdot \sin(45°)} \end{bmatrix} \oplus \begin{bmatrix} 1 \\ e^{-j\pi \cdot 4 \cdot 1 \cdot \sin(40°)} \\ e^{-j\pi \cdot 4 \cdot 2 \cdot \sin(40°)} \\ e^{-j\pi \cdot 4 \cdot 3 \cdot \sin(40°)} \end{bmatrix}$$

Changed part     No change

HYBRID-BEAMFORMING METHOD AND DEVICE FOR SUPPORTING MULTI-RANKS IN WIRELESS ACCESS SYSTEM

CROSS-REFERENCE TO RELATED APPLICATIONS

This application is the National Stage filing under 35 U.S.C. 371 of International Application No. PCT/KR2015/006712, filed on Jun. 30, 2015, which claims the benefit of U.S. Provisional Application No. 62/025,504, filed on Jul. 17, 2014, the contents of which are all hereby incorporated by reference herein in their entirety.

TECHNICAL FIELD

The present invention relates to a wireless access system and, more particularly, a hybrid beamforming method for supporting multi-rank, a beam estimation method and an apparatus for supporting the same.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

DISCLOSURE

Technical Problem

A hybrid beamformer basically operates using a combination of analog beamforming and digital beamforming. At this time, since transmission regions of analog beams and digital beams are restricted to specific regions, multi-rank support or multi-user support may be restricted.

An object of the present invention devised to solve the problem lies in methods of efficiently deriving final beamforming coefficients for multi-rank and multi-user support using coarse analog beam based estimation information.

Another object of the present invention devised to solve the problem lies in methods of solving complexity upon analog/digital beam estimation for hybrid beamforming.

Another object of the present invention devised to solve the problem lies in apparatuses for supporting such methods.

The technical problems solved by the present invention are not limited to the above technical problems and other technical problems which are not described herein will become apparent to those skilled in the art from the following description.

Technical Solution

The present invention provides a hybrid beamforming method for supporting multi-rank, a beam estimation method and an apparatus for supporting the same.

The object of the present invention can be achieved by providing a hybrid beamforming method for supporting multi-rank in a wireless access system including a transmission end detecting two or more analog beam candidates having channel gain equal to or greater than a reference value, pre-compensating for analog beam coefficients of the two or more analog beam candidates such that one of the two or more analog beam candidates includes two or more digital beams, re-setting digital PMI coefficient values of the two or more digital beams to apply the pre-compensated analog beam coefficients, and transmitting multi-rank signals using the pre-compensated analog beam coefficients and the re-set digital PMI coefficient values. At this time, the hybrid beamforming may operate as a combination of analog beamforming and digital beamforming.

In another aspect of the present invention, provided herein is a transmission end for performing hybrid beamforming for supporting multi-rank in a wireless access system including a transmitter, a receiver, and a processor configured to control the transmitter and the receiver to perform the hybrid beamforming. At this time, the processor controls the receiver to detect two or more analog beam candidates having channel gain equal to or greater than a reference value, pre-compensates for analog beam coefficients of the two or more analog beam candidates such that one of the two or more analog beam candidates includes two or more digital beams, re-setts digital PMI coefficient values of the two or more digital beams to apply the pre-compensated analog beam coefficients, and controls the transmitter to transmit multi-rank signals using the pre-compensated analog beam coefficients and the re-set digital PMI coefficient values. The hybrid beamforming may operate as a combination of analog beamforming and digital beamforming.

The processor may include an analog beamformer supporting the analog beamforming and a digital beamformer supporting the digital beamforming.

The digital beamforming may be performed in a digital stage using a base band (BB) process, and the analog beamforming may be performed with respect to an analog signal generated from a digital signal subjected to the digital beamforming.

The number of multi-rank signals to be transmitted may be determined according to the number of the two or more digital beams.

Some of a plurality of physical antennas for the analog beamforming may be turned off, thereby reducing power consumption.

The aspects of the present invention are only a part of the preferred embodiments of the present invention, and various embodiments based on technical features of the present invention may be devised and understood by the person having ordinary skill in the art based on the detailed description of the present invention.

Advantageous Effects

As is apparent from the above description, the embodiments of the present invention have the following effects.

A hybrid beamformer basically operates using a combination of analog beamforming and digital beamforming. At this time, since transmission regions of analog beams and digital beams are restricted to specific regions, it is difficult to support multi-rank or multi-user beamforming. Accordingly, the embodiments of the present invention may efficiently support multi-rank or multi-user beamforming by deriving final beamforming coefficients using coarse analog beam based estimation information.

It will be appreciated by persons skilled in the art that the effects that can be achieved through the embodiments of the present invention are not limited to the above-described effects and other effects which are not described herein will be derived and understood from the above description of the embodiments of the present invention. That is, it will be appreciated by persons skilled in the art that the unintended effects that can be achieved by implementing the present invention may be derived from the embodiments of the present invention.

DESCRIPTION OF DRAWINGS

The accompanying drawings, which are included to provide a further understanding of the invention, illustrate embodiments of the invention and together with the description serve to explain the principle of the invention.

FIG. 17 is a diagram showing equations of digital precoding matrix indexes according to an embodiment.

BEST MODE

Figure 1:
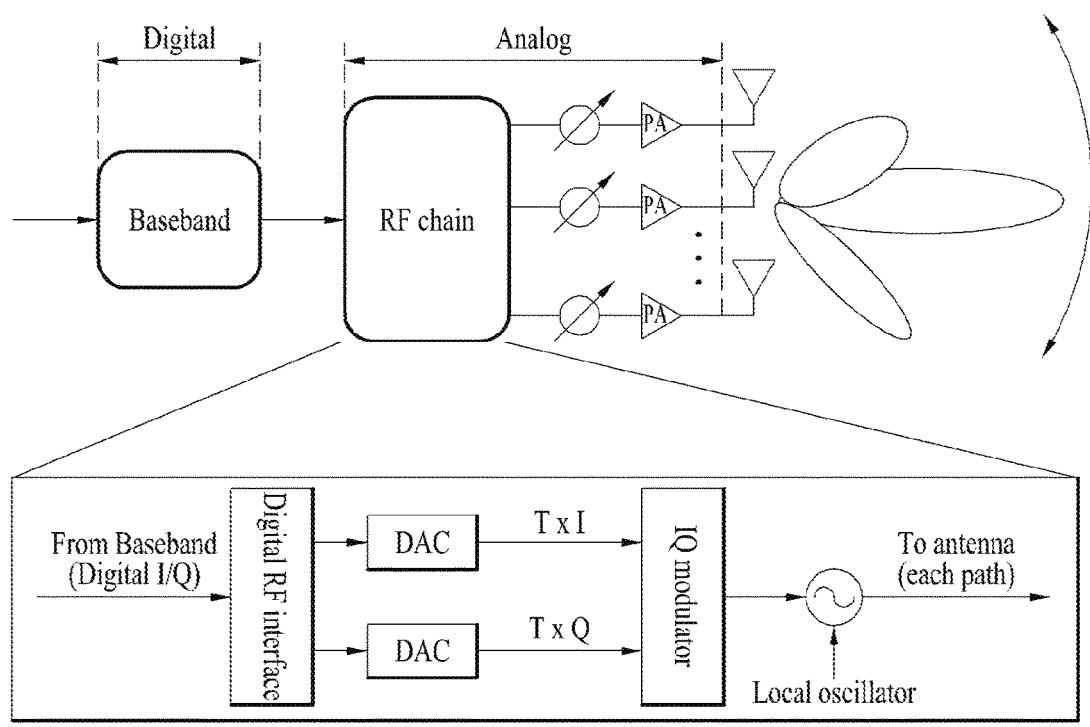
FIG. 1 is a block diagram showing a transmitter including an analog beamformer and a radio frequency (RF) chain.

The embodiments of the present invention described in detail below relate to a hybrid beamforming method for supporting multi-rank, a beam estimation method and an apparatus for supporting the same.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present invention (more particularly, in the context of the following claims) unless indicated otherwise in the specification or unless context clearly indicates otherwise.

In the embodiments of the present disclosure, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), an Advanced Base Station (ABS), an access point, etc.

In the embodiments of the present disclosure, the term terminal may be replaced with a UE, a Mobile Station (MS), a Subscriber Station (SS), a Mobile Subscriber Station (MSS), a mobile terminal, an Advanced Mobile Station (AMS), etc.

A transmitter is a fixed and/or mobile node that provides a data service or a voice service and a receiver is a fixed and/or mobile node that receives a data service or a voice service. Therefore, a UE may serve as a transmitter and a BS may serve as a receiver, on an UpLink (UL). Likewise, the UE may serve as a receiver and the BS may serve as a transmitter, on a DownLink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, and a 3GPP2 system. In particular, the embodiments of the present disclosure may be supported by the standard specifications, 3GPP TS 36.211, 3GPP TS 36.212, 3GPP TS 36.213, 3GPP TS 36.321 and 3GPP TS 36.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the invention.

The following detailed description includes specific terms in order to provide a thorough understanding of the present disclosure. However, it will be apparent to those skilled in the art that the specific terms may be replaced with other terms without departing the technical idea and scope of the present disclosure.

Hereinafter, 3GPP LTE/LTE-A system which is one of examples of wireless access systems which are used in the embodiments of the present invention.

The embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE. While the embodiments of the present disclosure are described in the context of a 3GPP LTE/LTE-A system in order to clarify the technical features of the present disclosure, the present disclosure is also applicable to an IEEE 802.16e/m system, etc.

1. Hybrid beamforming 1.1 Analog beamforming technology and digital beamforming technology Existing beamforming technology using multiple antennas may be roughly divided into analog beamforming technology and digital beamforming technology according to location, to which a beamforming weight vector/precoding vector is applied.

FIG. 1 is a block diagram showing a transmitter including an analog beamformer and a radio frequency (RF) chain.

First, the analog beamforming method is a representative beamforming method applied to an initial multi-antenna structure, which divides an analog signal subjected to digital signal processing into a plurality of paths and performs beamforming through a phase shifter (PS) and a power amplifier (PA) of each path. As shown in FIG. 1, for analog beamforming, an analog signal derived from a single digital signal needs to be processed by a PA and a PS connected to each antenna. That is, in an analog stage, a complex weight is processed by the PS and the PA. Here, a radio frequency (RF) chain means a processing block for converting a baseband (BB) signal into an analog signal and the configuration thereof is shown in FIG. 2.

In the analog beamforming method, beamforming accuracy is determined according to device characteristics of the PS and the PA. In addition, the analog beamforming method is suitable for narrowband transmission due to control characteristics of the devices. In contrast, due to a hardware structure in which it is difficult to implement multiple stream transmission, multiplexing gain for increasing a transfer rate is relatively low. In addition, it is difficult to perform beamforming per user based on orthogonal resource assignment.

Figure 2:
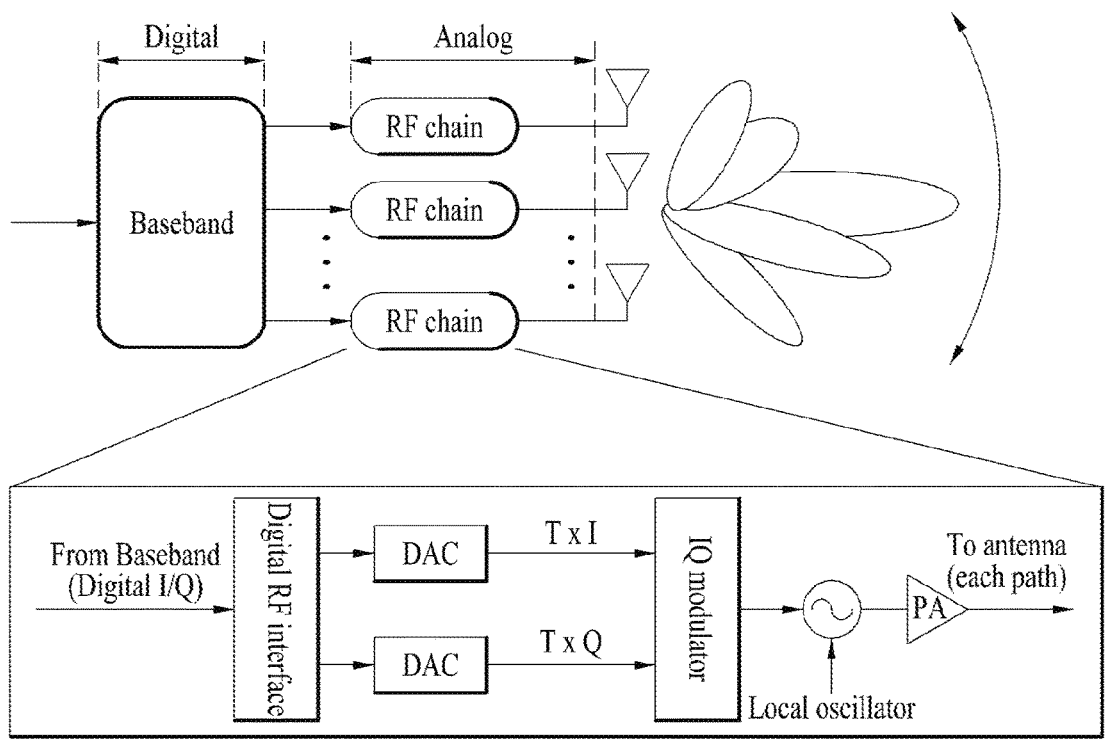
FIG. 2 is a block diagram showing a transmitter including a digital beamformer and a radio frequency (RF) chain.

FIG. 2 is a block diagram showing a transmitter including a digital beamformer and a radio frequency (RF) chain.

In digital beamforming, unlike analog beamforming, a transmitter performs beamforming in a digital stage using a BB process in order to maximize diversity and multiplexing gain in a multiple input multiple output (MIMO) environment. For example, as shown in FIG. 2, precoding is performed in a BB process such that beamforming is possible (here, an RF chain includes a PA), because a complex weight derived for beamforming is directly applied to transmitted data.

In addition, in the digital beamforming method, since beamforming may be differently performed per user, it is possible to support simultaneous beamforming for multiple users. Since beamforming is independently performed per user, to which orthogonal resources are assigned, scheduling flexibility is high and a transmission end suiting a system purpose can be employed. In addition, if MIMO-orthogonal frequency division multiplexing (OFDM) technology is applied in a broadband transmission environment, it is possible to form an independent beam per subcarrier. Accordingly, the digital beamforming method can optimize a maximum single user transfer rate based on enhanced beam gain and system capacity enhancement. Therefore, in a current 3G/4G system, digital beamforming based MIMO technology has been introduced.

Next, a massive MIMO environment in which the number of transmit/receive antennas is significantly increased will be described.

In general, in cellular communication, assume that a maximum number of transmit/receive antennas applied to the MIMO environment is 8. However, as massive MIMO has evolved, the number of antennas may be increased to several tens of antennas or several hundred antennas. If digital beamforming technology is applied in the massive MIMO environment, since signal processing for several hundreds of antennas for digital signal processing of a transmission end is performed through a BB process, signal processing complexity is significantly increased. In addition, since RF chains corresponding in number to the number of antennas are required, hardware implementation complexity is significantly increased.

In addition, since independent channel estimation of all antennas is required and feedback information of a massive MIMO channel including all antennas is required in a frequency division duplex (FDD) system, pilot and feedback overhead are significantly increased. In contrast, if analog beamforming technology is applied in the massive MIMO environment, hardware complexity of a transmission end is relatively low, but performance increase due to use of multiple antennas is insignificant and resource assignment flexibility is lowered. In particular, it is difficult to control a beam per frequency upon broadband transmission.

Accordingly, in the massive MIMO environment, instead of exclusively selecting only one of the analog beamforming method and the digital beamforming method, a method of configuring a hybrid transmission end which is a combination of an analog beamforming structure and a digital beamforming structure is necessary. That is, as shown in Table 1 below, using a relationship between performance gain and complexity of an analog beamforming method and a digital beamforming method, a hybrid transmission end capable of decreasing hardware implementation complexity thereof and maximizing beamforming gain using a massive antenna array needs to be designed.

TABLE 1

| | Beamforming accuracy control ease | Multi-carrier beam control | Multi-stream transmission | Hardware complexity (BB process) | Pilot and feedback overhead |
|---|---|---|---|---|---|
| Analog beamforming method | low (relationship PA/PS device characteristics) | Impossible or difficult | Impossible or difficult | Low | Low |
| Digital beamforming method | high | Possible | Possible | High | High |

1.2 Hybrid beamforming

The purpose of hybrid beamforming is to configure a transmission end having merits of an analog beamforming method and a digital beamforming method while decreasing hardware complexity in a massive MIMO environment.

Figure 3:
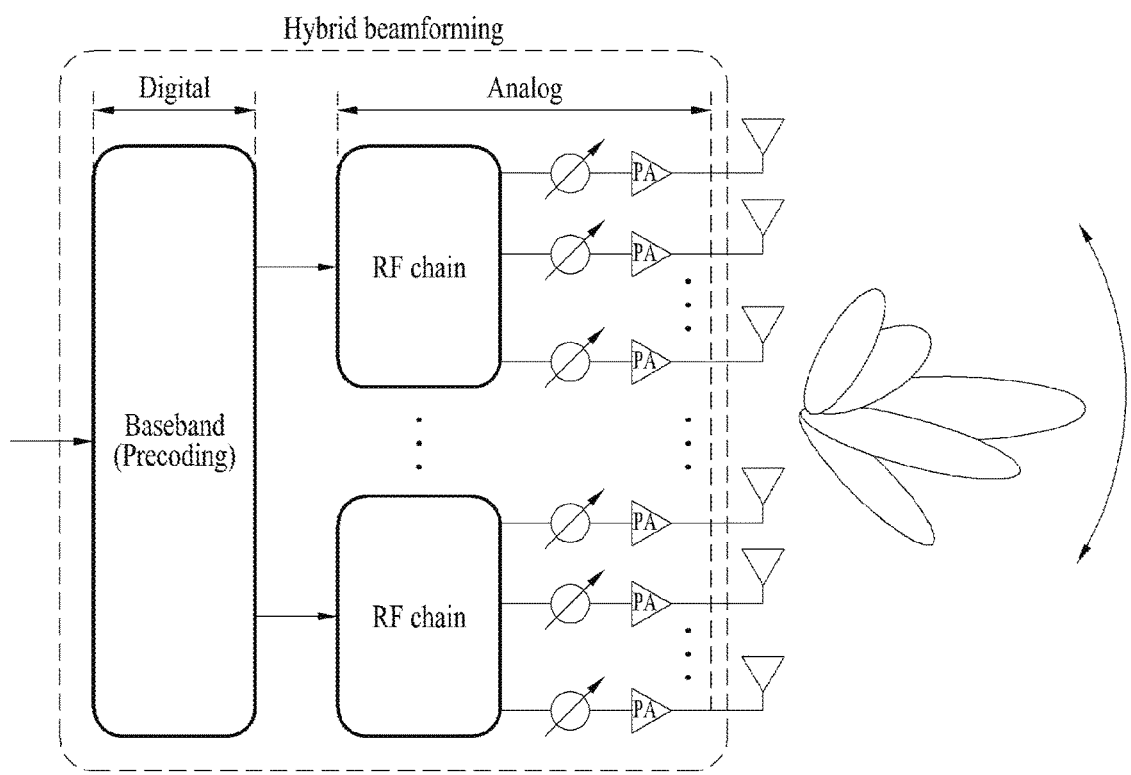
FIG. 3 is a block diagram showing a transmission end including a hybrid beamformer.

FIG. 3 is a block diagram showing a transmission end including a hybrid beamformer.

As shown in FIG. 3, a hybrid beamforming method may be configured to perform coarse beamforming using an analog beamforming method and to perform multi-stream or multi-user transmission using a digital beamforming method.

As a result, a hybrid beamforming method is obtained by simultaneously utilizing the analog beamforming method and the digital beamforming method in order to decrease implementation complexity or hardware complexity of the transmission end. Fundamentally, technical issues of the hybrid beamforming method will now be described.

(1) Difficulty in optimization of analog/digital beamforming design

Optimization simultaneously considering analog beamforming and digital beamforming has the following difficulties. Fundamentally, a beamforming method is independently applicable per user using the same time-frequency resources in digital beamforming but a common beamforming method should be applied using the same time-frequency resources in analog beamforming. Accordingly, this restricts optimization of the number of supportable ranks, beam control flexibility and beamforming resolution.

For example, there are problems such as 1) maximum rank restriction according to the number of RF chains, 2) difficulty in subband beam control by RF beamformer and 3) beam resolution/granularity segmentation problems.

(2) Necessity of embodying common signal transmission method

In the analog beamforming method for forming a beam only in a specific direction using the same time-frequency resources, it is impossible to simultaneously form a plurality of beams in all UE directions. Accordingly, common signals such as an uplink/downlink control channel, a reference signal (RS), a broadcast channel, a synchronous signal, etc. cannot be simultaneously transmitted to all UEs distributed in an entire area of a cell. In addition, problems may be caused in transmission of an uplink RACH channel, a sounding reference signal, a physical uplink control channel (PUCCH), etc.

(3) Necessity for additional pilot and feedback design for analog/digital beamforming If analog/digital beam estimation is performed, a digital beam may use an existing orthogonal pilot assignment scheme without change but an analog beam requires a predetermined time-duration corresponding to the number of beam candidates. This means that time delay for analog beam estimation is large and complexity is significantly increased when an analog beam is estimated simultaneously with a digital beam.

For example, system loss may be caused due to increase in time delay for analog beam estimation and beam estimation complexity may be increased due to increase in combinations of analog and digital beams.

(4) Difficulty in supporting analog beam based SDMA and FDMA

In the digital beamforming method, beamforming for multi-user/stream is freely performed. However, in the analog beamforming method, since the same beamforming is performed with respect to an entire transmission band, it is difficult to independently perform beamforming per user or per stream. In particular, since it is difficult to support FDMA via orthogonal frequency resource assignment, it is difficult to optimize frequency resource efficiency.

For example, it may be difficult to support orthogonal frequency division multiple access (OFDMA) for supporting multiple access due to difficulty in independent beamforming per user in the frequency domain at the same time and to support single user-MIMO (SU-MIMO) for supporting multiple streams due to difficulty in independent beamforming per stream at the same frequency-time. In addition, it may be difficult to support multi user-MIMO (MU-MIMO) for supporting multiple users due to difficulty in independent beamforming per user at the same frequency-time In order to solve such technical issues, the embodiments of the present invention provide methods for solving analog/digital beam estimation complexity for hybrid beamforming.

1.3 Hybrid beamforming system model

Figure 4:
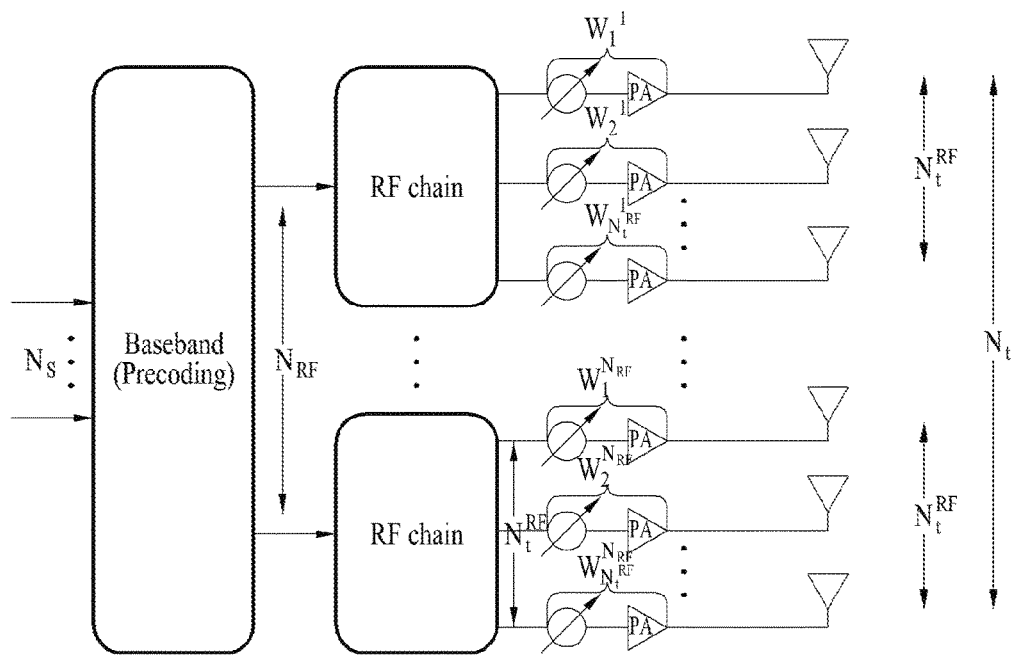
FIG. 4 is a diagram showing an example of the structure of a hybrid beamformer configured in a basic transmission end.

FIG. 4 is a diagram showing an example of the structure of a hybrid beamformer configured in a basic transmission end.

As shown in FIG. 4, a transmission end structure including only $N_t^{RF}$ independent antennas per RF chain may be assumed. Accordingly, a relationship between the total number of antennas and the number of antennas per RF chain is $N_t = N_t^{RF} \times N_{RF}$. Finally, since a signal passing through a phase shifter (PS) and a power amplifier (PA) per RF chain is independently sent to a transmit antenna, a matrix type system model shown in Equation 1 below may be derived.

$$y_k = H_k F^{RF} F_k^{BB} s_k + z_k \quad \text{[Equation 1]}$$

In Equation 1, $y_k$ denotes a received signal vector $N_r \times 1$ at a k-th subcarrier, $H_k$ denotes an $N_r \times N_t$ channel of the k-th subcarrier, $F^{RF}$ denotes an $N_t \times N_t$ RF precoder equally configured in all subcarriers, and $F_k^{BB}$ denotes an $N_{RF} \times N_S$ baseband precoder at the k-th subcarrier, which is changeable according to subcarrier. In addition, $s_k$ denotes a transmitted signal vector $N_S \times 1$ at the k-th subcarrier and $z_k$ denotes a noise signal vector $N_r \times 1$ at the k-th subcarrier.

At this time, k denotes a subcarrier index (k=0,1,2, ..., $N_{FFT}$-1), $N_{FFT}$ denotes the total number of subcarriers as a Fast Fourier Transform (TTF) size and $N_{RF}$ denotes the total number of RF chains.

In addition, $N_t$ denotes the total number of antennas of the transmission end, $N_t^{RF}$ denotes the number of transmit antennas included per RF chain, $N_r$ denotes the total number of antennas of the reception end, and $N_s$ denotes the number of streams of transmitted data.

At this time, Equation 2 below may be obtained by solving Equation 1 with respect to a subcarrier k.

$$\begin{bmatrix} y^{(1)} \\ \vdots \\ y^{(N_r)} \end{bmatrix} = \begin{bmatrix} h_{11} & h_{12} & \cdots & h_{1N_t} \\ h_{21} & h_{22} & \cdots & h_{2N_t} \\ \vdots & \vdots & \ddots & \vdots \\ h_{N_r 1} & h_{N_r 2} & \cdots & h_{N_r N_t} \end{bmatrix} \quad \text{[Equation 2]}$$

$$F^{RF} \left( \begin{bmatrix} v_{1,1} & v_{1,2} & \cdots & v_{N_{RF}, N_S} \\ v_{2,1} & v_{2,2} & \cdots & v_{N_{RF}, N_S} \\ \vdots & \vdots & \ddots & \vdots \\ v_{N_{RF},1} & v_{N_{RF},2} & \cdots & v_{N_{RF}, N_S} \end{bmatrix} \begin{bmatrix} x^{(1)} \\ \vdots \\ x^{(N_S-1)} \end{bmatrix} \right) +$$

$$\begin{bmatrix} z^{(1)} \\ \vdots \\ z^{(N_r)} \end{bmatrix}$$

In Equation 2, an analog beamforming equivalent precoding matrix $F^{RF}$ ($N_t \times N_{RF}$ matrix) obtained by a phase shifter and PA for changing the phase of a beam after an RF chain may be defined as shown in Equation 3 below.

$$F^{RF} = \begin{bmatrix} w_{N_t^{RF}}^1 & 0 & 0 & \cdots & 0 \\ 0 & w_{N_t^{RF}}^2 & 0 & \cdots & 0 \\ 0 & 0 & w_{N_t^{RF}}^3 & \cdots & 0 \\ \vdots & \vdots & \vdots & \ddots & \vdots \\ 0 & 0 & 0 & \cdots & w_{N_t^{RF}}^{N_{RF}} \end{bmatrix} \quad \text{[Equation 3]}$$

In addition, a precoding weight per RF chain of the RF precoding matrix $F^{RF}$ may be defined as shown in Equation 4 below.

$$w_{N_t^{RF}}^j = \begin{bmatrix} w_1^j \\ w_2^j \\ \vdots \\ w_{N_t^{RF}}^j \end{bmatrix} \quad \text{[Equation 4]}$$

Figure 5:
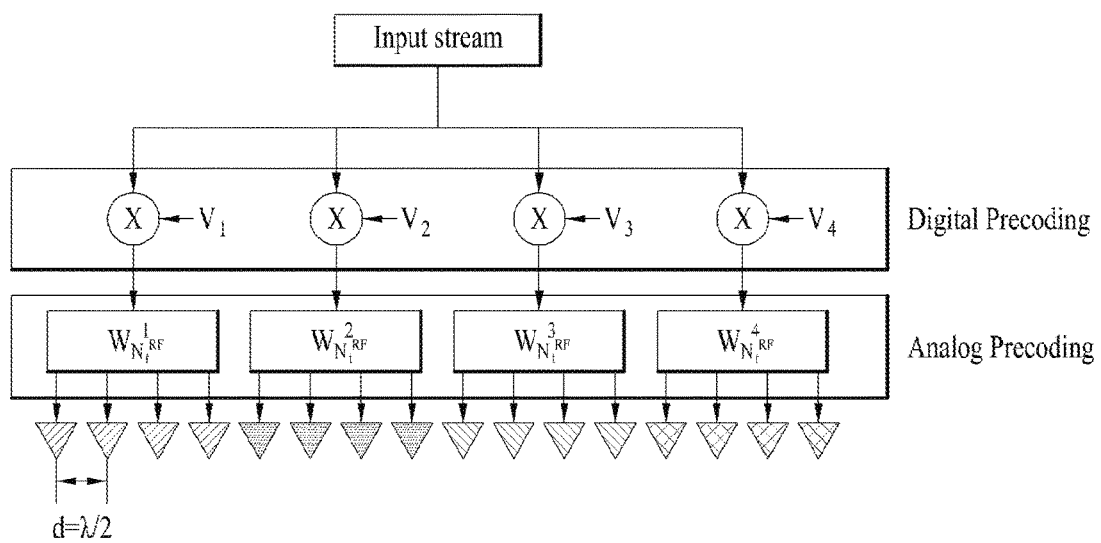
FIG. 5 is a diagram showing a 16-ULA antenna structure including four RF chains.

1.4 Beam radiation pattern of hybrid beamformer (BF) for uniform linear array (ULA) antenna FIG. 5 is a diagram showing a 16-ULA antenna structure including four RF chains.

An array response vector of a ULA antenna may be defined as shown in Equation 5 below.

$$a(\theta) = \begin{bmatrix} 1 & \exp\left(\frac{j2\pi \times 1 \times d}{\lambda}\sin(\theta)\right) & \exp\left(\frac{j2\pi \times 2 \times d}{\lambda}\sin(\theta)\right) & \cdots & \exp\left(\frac{j2\pi \times (N_t-1) \times d}{\lambda}\sin(\theta)\right) \end{bmatrix}^T \quad \text{[Equation 5]}$$

where, $\lambda$ denotes a wavelength and d denotes a distance between antennas. In order to indicate the antenna radiation pattern of the hybrid beamformer, for convenience, assume that the number of RF chains is 4 and the number of analog antennas per RF chain is 4. Such a beamformer is shown in FIG. 5. At this time, the total number of transmit antennas is 16 and the distance between antennas is d=$\lambda$/2.

At this time, the PS and the PA of the analog terminal may be represented by an equivalent beamforming weight and may be defined as shown in Equation 6 below.

$$F^{RF} = \begin{bmatrix} w_{N_t^{RT}}^1 & 0 & 0 & 0 \\ 0 & w_{N_t^{RF}}^2 & 0 & 0 \\ 0 & 0 & w_{N_t^{RF}}^3 & 0 \\ 0 & 0 & 0 & w_{N_t^{RF}}^4 \end{bmatrix}, \quad w_{N_t^{RF}}^j = \begin{bmatrix} w_1^j \\ w_2^j \\ w_3^j \\ w_4^j \end{bmatrix} \quad \text{[Equation 6]}$$

At this time, an arbitrary rank-1 weight vector applied in a digital beamforming stage may be defined as shown in Equation 7 below.

$$F^{BB} = v_1 = [v_v \; v_2 \; v_3 \; v_4]^T \quad \text{[Equation 7]}$$

An antenna array response vector, to which analog beamforming of Equation 6 and digital beamforming of Equation 7 are applied, may be expressed by Equation 8 below. At this time, assume that the distance between the antennas is d=$\lambda$/2. Each antenna array response vector may be expressed by a sum of all vector elements.

$$\sum a(\theta) = \sum_{i=0}^{15} a_i(\theta) = (1 \cdot w_1^1 + (j\pi \times \sin(\theta)) \cdot W_1^2 + \quad \text{[Equation 8]}$$
$$\exp(j\pi 2 \times \sin(\theta)) \cdot w_1^3 + \exp(j\pi 3 \times \sin(\theta)) \cdot w_1^4) \times v_1 +$$
$$(\exp(j\pi 4 \times \sin(\theta)) \cdot w_2^1 + \exp(j\pi 5 \times \sin(\theta)) \cdot w_2^2 +$$
$$\exp(j\pi 6 \times \sin(\theta)) \cdot w_2^3 + \exp(j\pi 7 \times \sin(\theta)) \cdot w_2^4) \times v_2 +$$
$$(\exp(j\pi 8 \times \sin(\theta)) \cdot w_3^1 + \exp(j\pi 9 \times \sin(\theta)) \cdot w_3^2 +$$
$$\exp(j\pi 10 \times \sin(\theta)) \cdot w_3^3 + \exp(j\pi 11 \times (\theta)) \cdot w_3^4) \times v_3 +$$
$$(\exp(j\pi 12 \times \sin(\theta)) \cdot w_4^1 + \exp(j\pi 13 \times \sin(\theta)) \cdot w_4^2 +$$
$$\exp(j\pi 14 \times \sin(\theta)) \cdot w_4^3 + \exp(j\pi 15 \times \sin(\theta)) \cdot w_4^4) \times v_4$$

At this time, an analog beamforming weight may be set as shown in Equation 9 below. This is an analog beamforming weight setting method which is generally applied in order to set boresight through analog beamforming.

$$w_1^1 = \begin{bmatrix} 1 \\ e^{-j\pi \sin(\phi)} \\ e^{-j\pi 2 \sin(\phi)} \\ e^{-j\pi 3 \sin(\phi)} \end{bmatrix}, \quad \text{[Equation 9]}$$

-continued $$w_2^1 = \begin{bmatrix} e^{-j\pi 4 sin(\phi)} \\ e^{-j\pi 5 sin(\phi)} \\ e^{-j\pi 6 sin(\phi)} \\ e^{-j\pi 7 sin(\phi)} \end{bmatrix} = e^{j\pi 4 sin(\theta)} \begin{bmatrix} 1 \\ e^{-j\pi sin(\phi)} \\ e^{-j\pi 2 sin(\phi)} \\ e^{-j\pi 3 sin(\phi)} \end{bmatrix},$$

$$w_3^1 = \begin{bmatrix} e^{-j\pi 8 sin(\phi)} \\ e^{-j\pi 9 sin(\phi)} \\ e^{-j\pi 10 sin(\phi)} \\ e^{-j\pi 11 sin(\phi)} \end{bmatrix} = e^{j\pi 8 sin(\theta)} \begin{bmatrix} 1 \\ e^{-j\pi sin(\phi)} \\ e^{-j\pi 2 sin(\phi)} \\ e^{-j\pi 3 sin(\phi)} \end{bmatrix},$$

$$w_4^1 = \begin{bmatrix} e^{-j\pi 12 sin(\phi)} \\ e^{-j\pi 13 sin(\phi)} \\ e^{-j\pi 14 sin(\phi)} \\ e^{-j\pi 15 sin(\phi)} \end{bmatrix} = e^{j\pi 12 sin(\theta)} \begin{bmatrix} 1 \\ e^{-j\pi sin(\phi)} \\ e^{-j\pi 2 sin(\phi)} \\ e^{-j\pi 3 sin(\phi)} \end{bmatrix}$$

If Equation 8 is simplified using Equation 9, Equation 10 below can be obtained.

$\Sigma a(\theta) = (1 + \exp(j\pi[\sin(\theta) - \sin(\phi)]) + \exp(j\pi 2[\sin(\theta) - \sin(\phi)]) + \exp(j\pi 3[\sin(\theta) - \sin(\phi)])) \times (v_1 + \exp(j\pi 4[\sin(\phi)]) \cdot v_2 + \exp(j\pi 8[\sin(\theta) - \sin(\phi)]) \cdot v_3 + \exp(j\pi 12[\sin(\theta) - \sin(\phi)]) \cdot v_4)$ [Equation 10]

Equation 11 below is obtained by generalizing Equation 10.

$$\sum a(\theta) = (1 + \exp(j\pi[\sin(\theta) - \sin(\phi)]) + \\ \ldots + \exp(j\pi(N_t^{RF} - 1) \cdot [\sin(\theta) - \sin(\phi)])) \times \\ (v_1 + \exp(j\pi \cdot (N_t^{RF}) \cdot [\sin(\theta) - \sin(\phi)]) \cdot v_2 + \ldots + \\ \exp(j\pi \cdot [N_t^{RF} \cdot (N_{RF} - 1)] \cdot [\sin(\theta) - \sin(\phi)]) \cdot \\ v_{N_{RF}}) = \left(\sum_{i=1}^{N_t^{RF}} s_i\right) \times \left(\sum_{i=1}^{N_{RF}} t_i\right) = \sum s \times \sum t$$ [Equation 11]

where, φ denotes a degree for determining analog beamforming. For example, if φ=30° or π/6 is set, a beamforming direction having maximum beam gain at θ=30° or π/6 is set.

Figure 6:
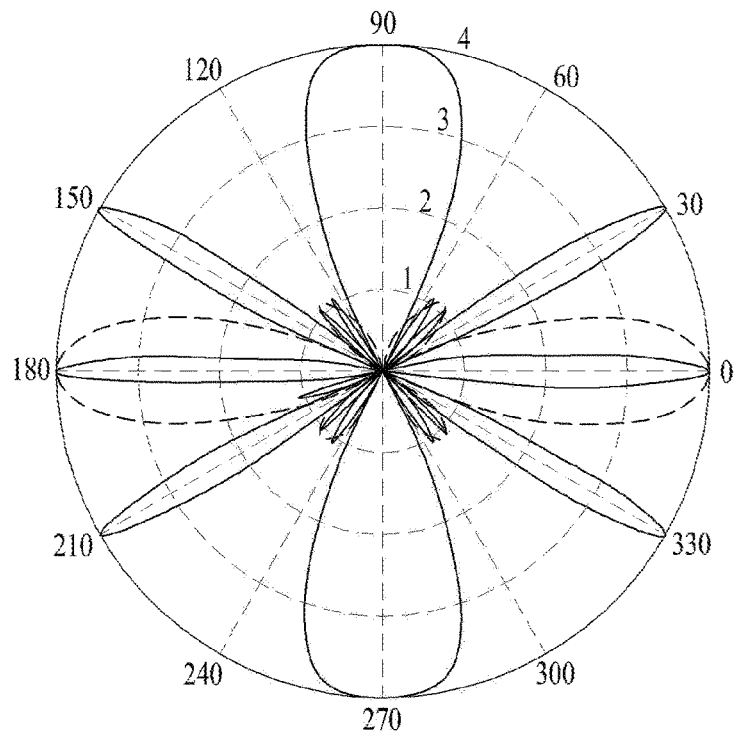
FIG. 6 is a diagram showing an example of a beam pattern of a beam bound vector and a beam steering vector.
Figure 7:
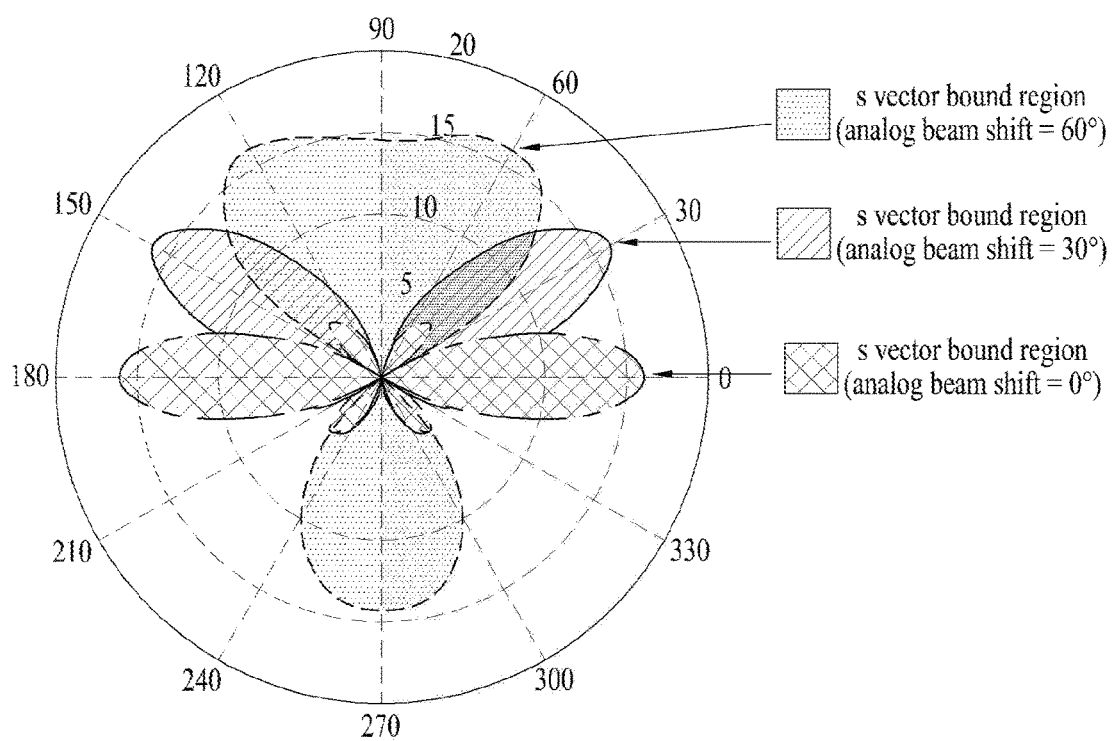
FIG. 7 is a diagram showing a final antenna array response according to analog beam shift.

In addition, a beam bound vector S determines an entire valid range and a digital beamforming range is restricted to a corresponding region. FIG. 6 is a diagram showing an example of a beam pattern of a beam bound vector and a beam steering vector. FIG. 7 is a diagram showing a final antenna array response according to analog beam shift.

Referring to FIG. 6, the beam bound vector s is denoted by a dotted line and beam gain and a beam steering vector t are denoted by a solid line. Finally, a cumulative beam pattern result of applying all vectors $v_1 = [v_1 \ v_2 \ v_3 \ v_4]^T$ for determining digital beamforming is shown in FIG. 7. That is, it can be seen that a valid beam range is restricted to the beam bound vector s.

1.5 Digital beam coefficient setting method considering analog beam coefficient

As described above, a beam pattern of hybrid beamforming is represented by the total number $N^{RF}$ of RF chains and the number $N_t^{RF}$ of analog antennas per RF chain as shown in Equation 11. Here, the weight vector of a digital beamforming coefficient has a length of $1 \times N_{RF}$. Here, a final beam direction is a combination of an analog beam weight and a digital beam weight. Problems which may occur upon applying digital beamforming without pre-compensating for analog beamforming will now be described. In addition, hereinafter, for convenience of description, a description will be given based on Equation 10 ($N_t$=16, $N_t^{RF}$=4, $N_{RF}$=4)) At this time, the digital beamforming weight $v=[v_1 \ v_2 \ v_3 \ v_4]^T$ of Equation 10 may be designed as shown in Equation12 below.

$$v = \begin{bmatrix} v_1 \\ v_2 \\ v_3 \\ v_4 \end{bmatrix} = \begin{bmatrix} 1 \\ e^{-j\pi 4 sin(\psi)} \\ e^{-j\pi 8 sin(\psi)} \\ e^{-j\pi 12 sin(\psi)} \end{bmatrix}$$ [Equation 12]

Equation 13 below may be obtained by generalizing Equation 12.

$$v = \begin{bmatrix} v_1 \\ v_2 \\ \vdots \\ v_{N_{RF}} \end{bmatrix} = \begin{bmatrix} 1 \\ e^{-j\pi \cdot N_t^{RF} \cdot 1 \cdot sin(\psi)} \\ \vdots \\ e^{-j\pi \cdot N_t^{RF} \cdot (N_{RF}-1) \cdot sin(\psi)} \end{bmatrix}$$ [Equation 13]

In Equation 12 and 13, a final array response vector considering a digital beamforming angle may be defined as shown in Equation 14 below.

$\Sigma a(\theta) = (1 + \exp(j\pi[\sin(\theta) - \sin(\phi)]) + \exp(j\pi 2[\sin(\theta) - \sin(\phi)]) + \exp(j\pi 3[\sin(\theta) - \sin(\phi)])) \times \{(1 + \exp(j\pi 4[\sin(\theta) - \sin(\phi) - \sin(\psi)]) + \exp(j\pi 8[\sin(\theta) - \sin(\psi)]) + \exp(j\pi 12[\sin(\theta) - \sin(\psi)])\}$ [Equation14]

In Equation 14, [sin (θ)−sin (φ)−sin (ψ)] between brackets determines a final beamforming angle. That is, by adjusting sin (φ) through analog beamforming and controlling sin (ψ) through digital beamforming, sin (θ) having maximum beam gain is finally adjusted. At this time, if boresight is set to φ=30° through analog beamforming and ψ=5° is set through digital beamforming for fine tuning, Equation 14 is finally changed to Equation 15.

$\Sigma a(\theta) = (1 + \exp(j\pi[\sin(\theta) - \sin(30°)]) + \exp(j\pi 2[\sin(\theta) - \sin(30°)]) + \exp(j\pi 3[\sin(\theta) - \sin(30°)])) \times (1 + \exp(j\pi 4[\sin(\theta) - \sin(30°) - \sin(5°)]) + \exp(j\pi 8[\sin(\theta) - \sin(30°) - \sin(5°)]) + \exp(j\pi 12[\sin(\theta) - \sin(30°) - \sin(5°)]))$ Equation 15

As a result, an angle having maximum beam gain is θ satisfying sin (θ)−sin (30°)−sin (5°)=0. That is, in beamforming, assume that the beam may be finally shifted by 35° shifting the beam by 30° through analog beamforming and shifting the beam by 5° through digital beamforming. However, θ satisfying sin (θ)−sin (30°)−sin (5°)=0 is not accurately 35°. That is, a relationship of θ≈φ+ψ is approximately satisfied. However, in this case, as a beam control range by analog/digital beamforming increases, since a beamforming setting angle satisfying sin (θ)=sin (φ)+sin (ψ) has a relationship of θ≠φ+ψ, the above assumption is no longer valid.

Accordingly, the present invention provides methods of accurately performing beam control by performing pre-compensation with respect to analog beamforming upon performing digital beamforming. That is, a digital beamforming coefficient may be set based on Equation 16 below.

$$v = \begin{bmatrix} v_1 \\ v_2 \\ \vdots \\ v_{N_{RF}} \end{bmatrix} \qquad \text{[Equation 16]}$$

$$= \begin{bmatrix} 1 \\ e^{j\pi \cdot N_t^{RF} \cdot 1 \cdot (\sin(\phi) - \sin(\phi+\psi))} \\ \vdots \\ e^{j\pi \cdot N_t^{RF} \cdot (N_{RF}-1) \cdot (\sin(\phi) - \sin(\phi+\psi))} \end{bmatrix}$$

$$= \begin{bmatrix} 1 \\ e^{j\pi \cdot N_t^{RF} \cdot 1 \cdot \sin(\phi)} e^{-j\pi \cdot N_t^{RF} \cdot 1 \cdot \sin(\phi+\psi)} \\ \vdots \\ e^{j\pi \cdot N_t^{RF} \cdot (N_{RF}-1)\sin(\phi)} e^{-j\pi \cdot N_t^{RF} \cdot (N_{RF}-1)\sin(\phi+\psi)} \end{bmatrix}$$

$$= \begin{bmatrix} 1 \\ e^{j\pi \cdot N_t^{RF} \cdot 1 \cdot \sin(\phi)} \\ \vdots \\ e^{j\pi \cdot N_t^{RF} \cdot (N_{RF}-1)\sin(\phi)} \end{bmatrix} \otimes \begin{bmatrix} 1 \\ e^{-j\pi \cdot N_t^{RF} \cdot 1 \cdot \sin(\phi+\psi)} \\ \vdots \\ e^{-j\pi \cdot N_t^{RF} \cdot (N_{RF}-1)\sin(\phi+\psi)} \end{bmatrix}$$

⊕: Hadamard product

In Equation 16, $$\begin{bmatrix} 1 \\ e^{j\pi \cdot N_t^{RF} \cdot 1 \cdot \sin(\phi)} \\ \vdots \\ e^{j\pi \cdot N_t^{RF} \cdot (N_{RF}-1)\sin(\phi)} \end{bmatrix}$$

serves to pre-compensate for the analog beam and $$\begin{bmatrix} 1 \\ e^{-j\pi \cdot N_t^{RF} \cdot 1 \cdot \sin(\phi+\psi)} \\ \vdots \\ e^{-j\pi \cdot N_t^{RF} \cdot (N_{RF}-1)\sin(\phi+\psi)} \end{bmatrix}$$

corresponds to a final digital beam.

A method of setting a final direction of a digital beam will now be described. For example, in an environment of $N_t=16$, $N_t^{RF}=4$, $N_{RF}=4$, in order to rotate all beams by $\phi=30°$ through analog beamforming and further rotate the beams by $\psi=5°$ through digital beamforming to set a final beam direction to 35°, a method of designing a digital beamforming coefficient may be defined as shown in Equation 17 below.

$$v = \begin{bmatrix} v_1 \\ v_2 \\ v_3 \\ v_4 \end{bmatrix} \qquad \text{[Equation 17]}$$

$$= \begin{bmatrix} 1 \\ e^{j\pi \cdot 4 \cdot 1 \cdot \sin(30°)} \\ e^{j\pi \cdot 4 \cdot 2 \cdot \sin(30°)} \\ e^{j\pi \cdot 4 \cdot 3 \cdot \sin(30°)} \end{bmatrix} \otimes \begin{bmatrix} 1 \\ e^{-j\pi \cdot 4 \cdot 1 \cdot \sin(35°)} \\ e^{-j\pi \cdot 4 \cdot 2 \cdot \sin(35°)} \\ e^{-j\pi \cdot 4 \cdot 3 \cdot \sin(35°)} \end{bmatrix}$$

$$= \begin{bmatrix} 1 \\ e^{j\pi \cdot 4 \cdot \sin(30°)} \\ e^{j\pi \cdot 8 \cdot \sin(30°)} \\ e^{j\pi \cdot 12 \cdot \sin(30°)} \end{bmatrix} \otimes \begin{bmatrix} 1 \\ e^{-j\pi \cdot 4 \cdot \sin(35°)} \\ e^{-j\pi \cdot 8 \cdot \sin(35°)} \\ e^{-j\pi \cdot 12 \cdot \sin(35°)} \end{bmatrix}$$

A final antenna array response vector obtained by applying the digital coefficient of Equation 16 to Equation 10 may be defined as shown in Equation 18 below.

$$\sum a(\theta) = \qquad \text{[Equation 18]}$$
$$(1 + \exp(j\pi[\sin(\theta) - \sin(\phi)]) + \exp(j\pi 2[\sin(\theta) - \sin(\phi)]) +$$
$$\exp(j\pi 3[\sin(\theta) - \sin(\phi)])) \times$$
$$(v_1 + \exp(j\pi 4[\sin(\theta) - \sin(\phi)]) \cdot v_2 +$$
$$\exp(j\pi 8[\sin(\theta) - \sin(\phi)]) \cdot v_3 +$$
$$\exp(j\pi 12[\sin(\theta) - \sin(\phi)]) \cdot v_4) =$$
$$(1 + \exp(j\pi[\sin(\theta) - \sin(\phi)]) + \exp(j\pi 2[\sin(\theta) - \sin(\phi)]) +$$
$$\exp(j\pi 3[\sin(\theta) - \sin(\phi)])) \times$$
$$\begin{pmatrix} 1 + \exp(j\pi 4[\sin(\theta) - \sin(\phi) + \sin(\phi) - \sin(\phi + \psi)]) + \\ \exp(j\pi 8[\sin(\theta) - \sin(\phi) + \sin(\phi) - \sin(\phi + \psi)]) + \\ \exp(j\pi 12[\sin(\theta) - \sin(\phi) + \sin(\phi) - \sin(\phi + \psi)]) \end{pmatrix} =$$
$$(1 + \exp(j\pi[\sin(\theta) - \sin(\phi)]) +$$
$$\exp(j\pi 2[\sin(\theta) - \sin(\phi)]) +$$
$$\exp(j\pi 3[\sin(\theta) - \sin(\phi)])) \times$$
$$(1 + \exp(j\pi 4[\sin(\theta) - \sin\phi + (\psi)]) +$$
$$\exp(j\pi 8[\sin(\theta) - \sin(\phi + \psi)]) +$$
$$\exp(j\pi 12[\sin(\theta) - \sin(\phi + \psi)]))$$

In Equation 18, in the case of $\phi=30°$, if a final beamforming rotation angle is set to 35° by applying $\psi=+5°$, Equation 19 is obtained.

$$\Sigma a(\theta) = (1+\exp(j\pi[\sin(\theta)-\sin(30°)])+\exp(j\pi 2[\sin(\theta)-\sin(30°)])+\exp(j\pi 3[\sin(\theta)-\sin(30°)])) \times (1+\exp(j\pi 4[\sin(\theta)-\sin(35°)])+\exp(j\pi 8[\sin(\theta)-\sin(35°)])+\exp(j\pi 12[\sin(\theta)-\sin(35°)])) \qquad \text{[Equation 19]}$$

Figure 8:
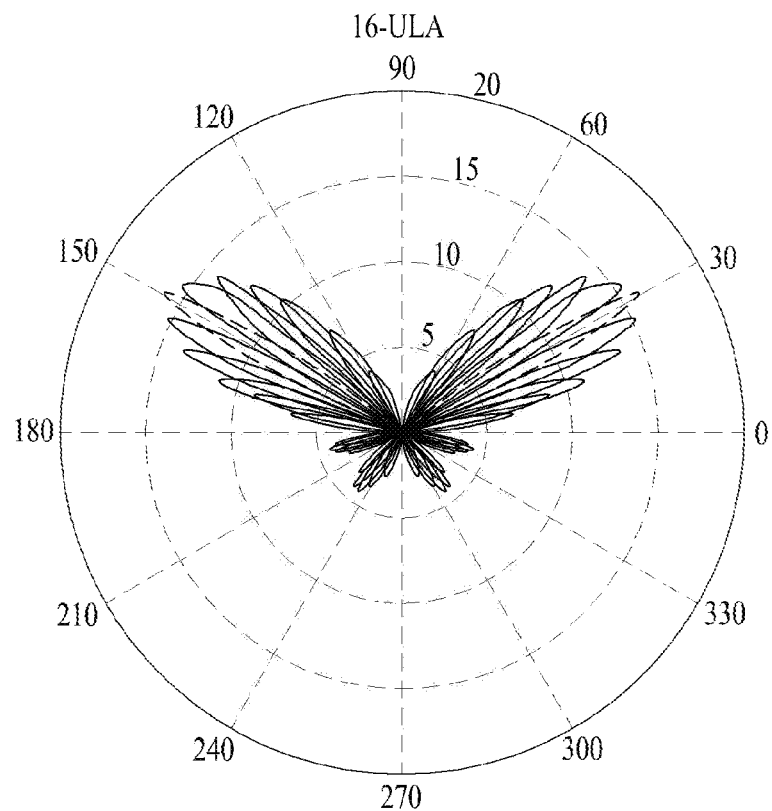
FIG. 8 is a diagram showing an antenna array response, to which digital beamforming coefficient design is applied.

If digital beamforming is performed with respect to $\psi=\pm 5°, \pm 10°, \pm 15°$, the beam shape of the final antenna array response vector shown in FIG. 8 is obtained. FIG. 8 is a diagram showing an antenna array response, to which digital beamforming coefficient design is applied.

Referring to the result shown in FIG. 8, accurate beam control of the hybrid beamformer is possible through such a digital beamforming coefficient design method.

2. Hybrid beamforming method for supporting multi-rank

Hereinafter, a multi-rank supporting method considering beam pattern properties of hybrid beamforming will be described. In the beam shape of hybrid beamforming described with reference to FIG. 8, it can be seen that a final sharp beam, to which a digital beam is applied, is bounded in an analog beam region.

2.1 First embodiment

Figure 9:
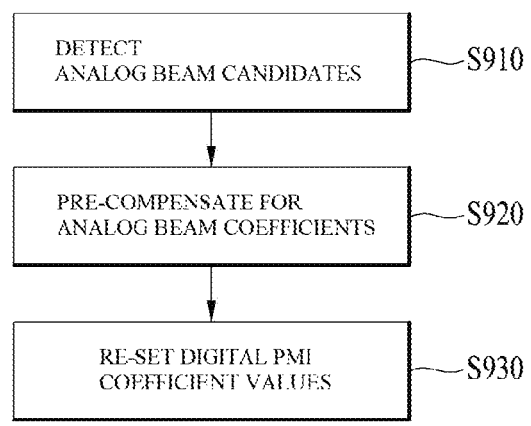
FIG. 9 is a diagram illustrating a hybrid beamforming method for supporting multi-rank at a transmission end.

FIG. 9 is a diagram illustrating a hybrid beamforming method for supporting multi-rank at a transmission end.

A transmission end searches coarse analog beams and detects a plurality of beam candidates having channel gain equal to or greater than a specific reference value (S910).

The transmission end pre-compensates for analog beam coefficients such that one analog beam (or a transmission region of an analog beam) includes a plurality of digital beams (or transmission regions of a plurality of digital beams) (S920).

Next, existing precoding matrix index (PMI) coefficient values may be re-set with respect to two or more digital beams so as to apply the pre-compensated analog beam coefficients (S930).

Hereinafter, the transmission end may transmit multi-rank signals through a hybrid beamforming method using the pre-compensated analog beam coefficients and the re-set digital PMI coefficients.

Hereinafter, the steps described with respect to FIG. 9 will be described in detail.

Figure 10:
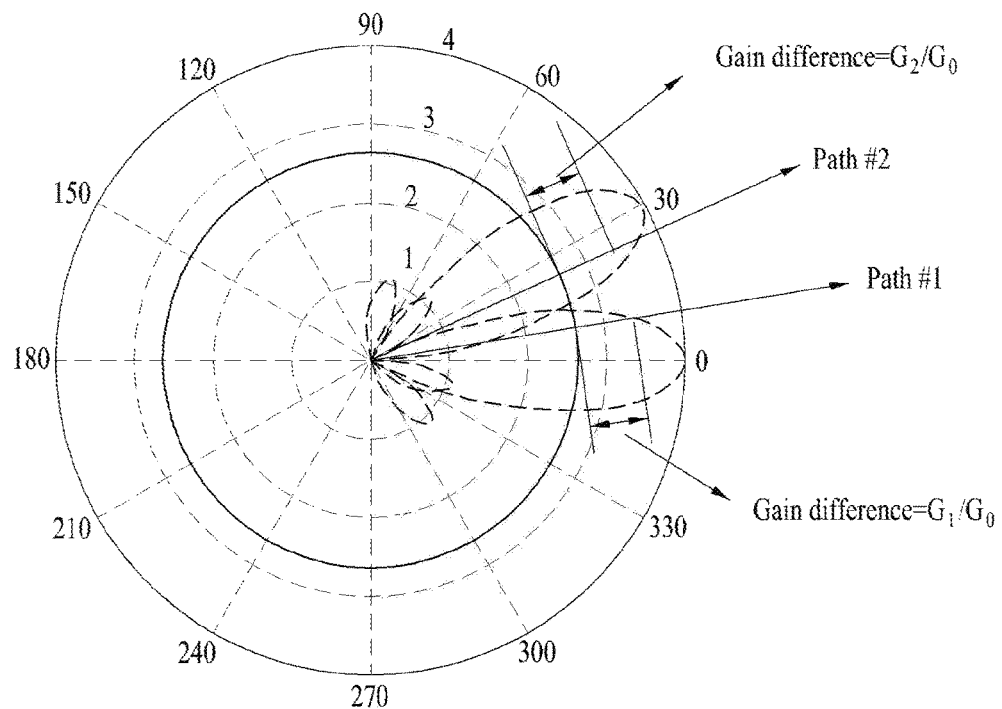
FIG. 10 is a diagram illustrating a method of calculating a gain difference between an analog beam and a reference beam.
Figure 11:
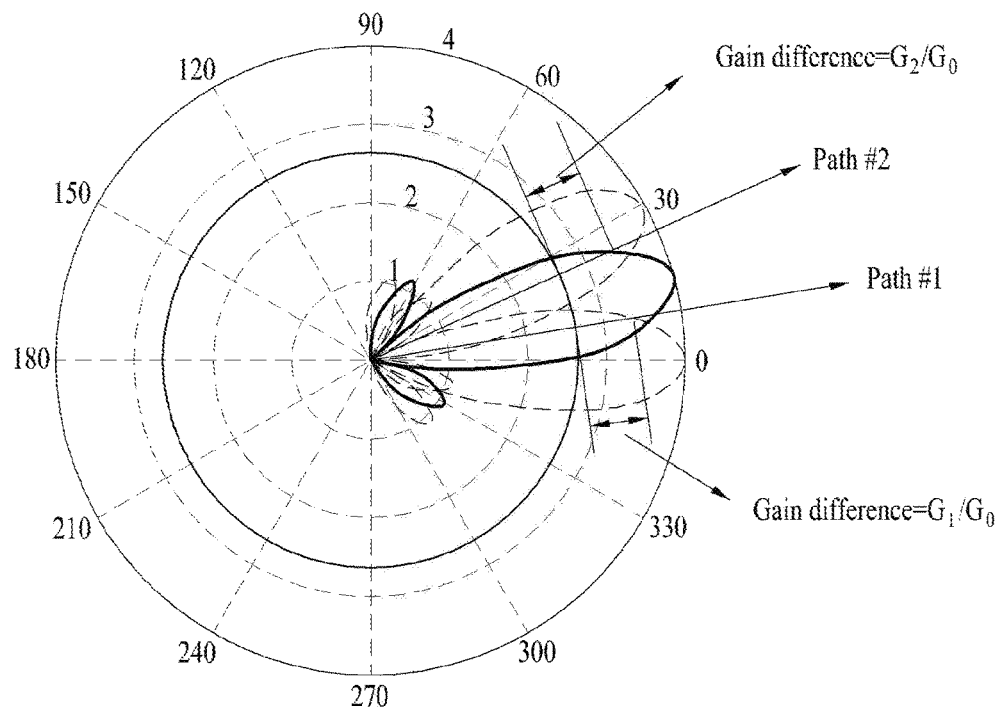
FIG. 11 is a diagram illustrating a method of reconfiguring an analog beam in order to support multi-rank.

FIG. 10 is a diagram illustrating a method of calculating a gain difference between an analog beam and a reference beam. FIG. 11 is a diagram illustrating a method of reconfiguring an analog beam in order to support multi-rank.

In FIGS. 10 and 11, a thick circle means a specific reference value for detecting an analog beam. That is, an analog beam which is outside the thick circle may be selected as a candidate beam.

The transmission end selects preferred analog and digital beam coefficients from among the coarse beams detected in step S910 as shown in FIG. 10. At this time, if the reception intensity or beam gain differences of the individual analog beams are similar, it can be seen that multiple ranks having similar beam gains are present.

If a path having a value greater than a threshold is detected in each coarse beam as shown in FIG. 10, the transmission end changes the boresight of an analog beam to the direction shown in FIG. 11. As a result, such a method predicts an analog beam capable of radiating only one coarse beam and locates multiple ranks within a corresponding range. In addition, the number of multi-rank signals which may be transmitted may be determined according to the number of two or more digital beams included in one analog beam.

At this time, if the digital beam coefficient or PMI acquired in the previous step is used simultaneously with the corrected analog beam, a beam direction may be changed, because the beamforming coefficient for hybrid beamforming is a combination of the analog beam coefficients and the digital beam coefficients.

Accordingly, the transmission end may maintain the existing PMI value of the digital beam using the method of designing the digital beam coefficient described in Chapter 1.5 and update only the analog beam coefficient, thereby accurately radiating a final sharp beam without an additional beam estimation procedure.

Figure 12:
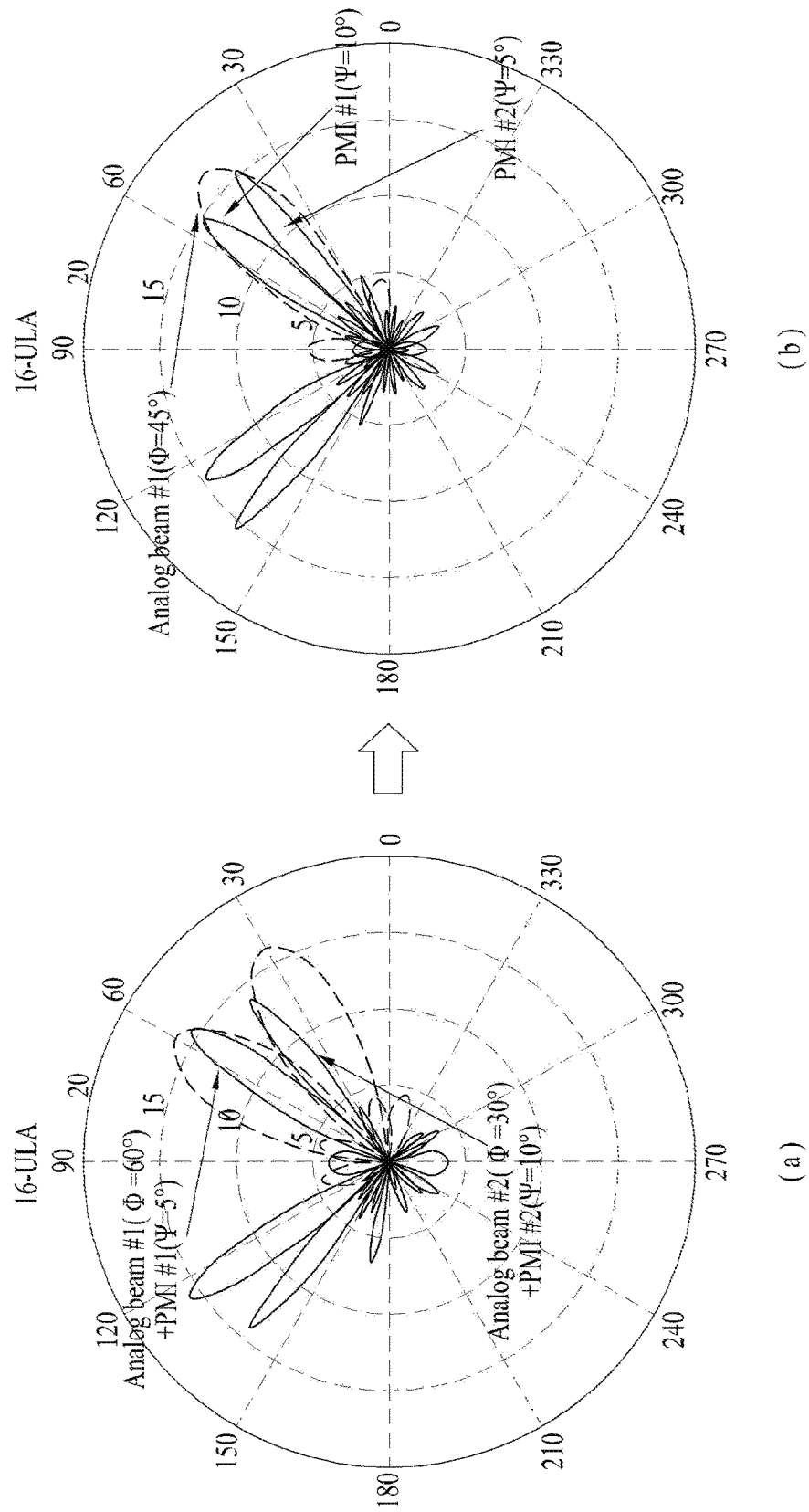
FIG. 12 is a diagram illustrating an example of reconfiguring the analog beam described in FIGS. 10 and 11.

FIG. 12 is a diagram illustrating an example of reconfiguring the analog beam described in FIGS. 10 and 11. At this time, FIG. 12(a) shows the shape of multiple beams having a first analog beam with $\phi=60°$, a first digital beam with $\psi=-5°$, a second analog beam with $\phi=30°$ and a second digital beam with $\psi=10°$ and FIG. 12(b) shows the shape of a final digital beam considering an analog beam pattern corrected through control.

Referring to FIG. 12(a), the first digital beam is included in the first analog beam and the second digital beam is included in the second analog beam. At this time, the first analog beam or the second analog beam may be pre-compensated for, such that two digital beams are included in one analog beam.

For example, if the direction of the final sharp beam estimated through a digital PMI is set to an analog beam having $\phi=60°$, a digital beam having $\psi=-5°$ and $\phi+\psi=55°$, digital PMI#1 of the sharp beam may be defined as shown in Equation 20 below.

$$PMI\#1 = v_1 \qquad \text{[Equation 20]}$$

$$= \begin{bmatrix} v_1 \\ v_2 \\ v_3 \\ v_4 \end{bmatrix}$$

$$= \begin{bmatrix} 1 \\ e^{j\pi \cdot 4 \cdot 1 \cdot sin(60°)} \\ e^{j\pi \cdot 4 \cdot 2 \cdot sin(60°)} \\ e^{j\pi \cdot 4 \cdot 3 \cdot sin(60°)} \end{bmatrix} \oplus \begin{bmatrix} 1 \\ e^{-j\pi \cdot 4 \cdot 1 \cdot sin(55°)} \\ e^{-j\pi \cdot 4 \cdot 2 \cdot sin(55°)} \\ e^{-j\pi \cdot 4 \cdot 3 \cdot sin(55°)} \end{bmatrix}$$

In addition, if the direction of the final sharp beam is set to an analog beam having $\phi=30°$, a digital beam having $\psi=10°$ and $\phi+\psi=40°$, digital PMI#2 of the sharp beam may be defined as shown in Equation 21 below.

$$PMI\#2 = v_2 \qquad \text{[Equation 21]}$$

$$= \begin{bmatrix} v_1 \\ v_2 \\ v_3 \\ v_4 \end{bmatrix}$$

$$= \begin{bmatrix} 1 \\ e^{j\pi \cdot 4 \cdot 1 \cdot sin(30°)} \\ e^{j\pi \cdot 4 \cdot 2 \cdot sin(30°)} \\ e^{j\pi \cdot 4 \cdot 3 \cdot sin(30°)} \end{bmatrix} \oplus \begin{bmatrix} 1 \\ e^{-j\pi \cdot 4 \cdot 1 \cdot sin(40°)} \\ e^{-j\pi \cdot 4 \cdot 2 \cdot sin(40°)} \\ e^{-j\pi \cdot 4 \cdot 3 \cdot sin(40°)} \end{bmatrix}$$

At this time, if the angle of the coarse analog beam is re-set to $\phi=45°$, FIG. 17 may be obtained by designing the digital beam coefficients again using Equation 17.

For the shape of the final digital beam considering the analog beam pattern re-corrected through FIG. 17, refer to FIG. 12.

That is, it can be seen that suitable multi-rank support is possible within a single analog beam. In addition, a coarse analog beam scanning process may he used without change and, instead of a beam gain difference shown as an example, general beam CQI information or beam reception power difference information may be used, thereby obtaining the same effects.

2.2 Second embodiment

Hereinafter, a method of directly changing predefined analog beam boresight at a transmission end in consideration of the angles of multiple beams upon transmitting the multiple beams will be described.

In the embodiment of the present invention, as in Chapter 2.1, multiple paths are formed at the boundary of a coarse analog beam. At this time, a target may be selected in consideration of an angle difference between the multiple beams forming the multiple paths and the bean width of an analog beam bounded pattern.

For example, if four RF chains for the transmission end are connected and four analog antennas are connected per RF chain, the antenna of the transmission end has a ULA structure shown in FIG. 5. At this time, the array response vector per RF chain may be defined as shown in Equation 23.

$$s = \begin{bmatrix} 1 \\ e^{j\pi \sin(\theta)} \\ e^{j\pi 2\sin(\theta)} \\ \vdots \\ e^{j\pi \times (N_t^{RF}-1) \times \sin(\theta)} \end{bmatrix} \quad \text{[Equation 23]}$$

Accordingly, if the analog beam bounded pattern is analyzed, the transmission end may approximately obtain a beam boundary based on fixed analog beam boresight. If an analog beam coefficient $F^{RF}$ for determining the boresight of the analog beam is given, it is possible to predict the valid range of the analog beam bounded pattern. The valid range of the analog beam bounded pattern may be defined as shown in Equation 24 below. That is, since a UE knows an antenna wavelength $\lambda$, a distance d between antennas and the number ($N=N_t^{RF}$) of antennas per RF chain, it is possible to adjust a design parameter $\alpha$ to determine the operation range of the digital PMI.

$$\Delta \theta = \alpha \frac{\lambda}{Nd} \quad \text{[Equation 24]}$$

For example, if $\alpha=0.886$ is set, the analog beam bounded pattern has a beam width of 3 dB. In Equation 24, N denotes the number of antennas and d denotes a distance between antennas.

$$\Delta \theta_{3dB} = 0.886 \frac{\lambda}{Nd} - d = \frac{\lambda}{2} - N = N_t^{RF} - 1 \quad \text{[Equation 25]}$$

Here, since the number of antennas per RF chain is 4, a 3-dB beam width $\Delta \theta_{3\ dB}$ may be determined by Equation 26 below.

$$N_t^{RF}=4 \rightarrow \Delta \theta_{3\ dB}=33.8° \quad \text{[Equation 26]}$$

For example, if a phase angle difference between the beams forming the multi-rank is within $\Delta \theta_{3\ dB}=33.8°$, multiple sharp analog beams may be formed in the range of one analog beam. Accordingly, the boresight of the analog beam is set to an intermediate region of the beam, thereby supporting multi-rank in one analog beam through hybrid beamforming.

In the related art, the transmission end should perform digital beam search again upon analog beam change. However, in the embodiments of the present invention, the transmission end does not need to perform digital beam search again upon analog beam change, because the analog beam is pre-compensated for and a digital beam coefficient is used without change. At this time, a UE may adjust boresight to the intermediate value of the angles of the paths using the pre-compensated part.

2.3 Third embodiment

A transmission end may change an analog beam width in consideration of the angle range of multiple beams upon transmitting the multiple beams.

In the embodiment of the present invention, beams are formed such that the estimated direction of multi-rank is outside the boundary of the analog beam. In hybrid beamforming, since multiple digital beams should be formed in a single analog beam, the beam width may increase in order to support the multi-rank.

In the ULA structure, as the number of physical antennas connected to a single RF chain increases, the beam width of an analog beam bounded pattern decreases. At this time, the physical antennas connected to the RF chain are turned on/off or an analog beam coefficient for generating a broad beam is directly applied, such that the transmission end increases the bounded width of the analog beam.

2.3.1 Method of reducing the number of valid physical antennas used for actual transmission in order to change the boundary of the analog beam In the embodiment of the present invention, the physical antenna of the analog beam may be turned off to adjust the beam width of the analog beam bounded pattern.

Figure 13:
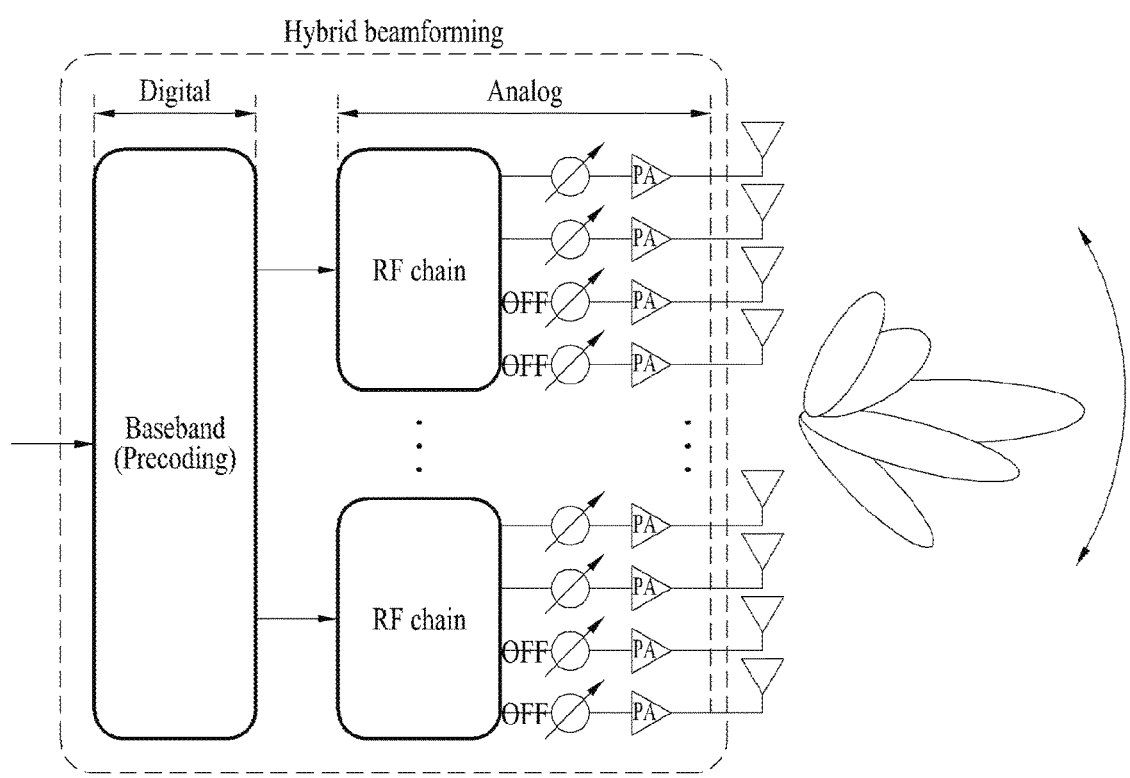
FIG. 13 is a block diagram showing a transmitter including analog and digital beamformers.
Figure 14:
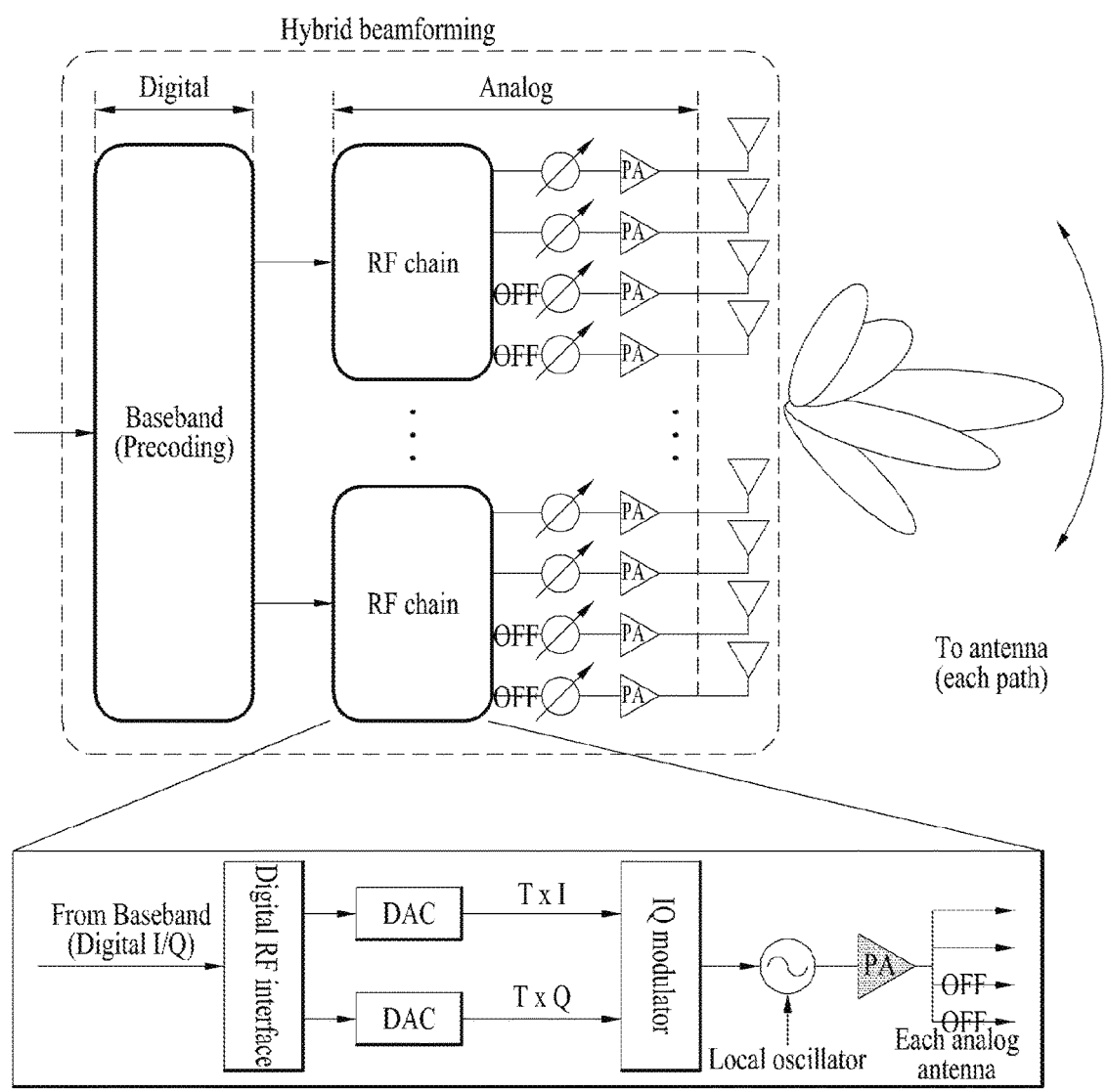
FIG. 14 is a diagram showing an antenna on/off structure for adjusting the beam width of an analog beam bounded pattern.

FIG. 13 is a block diagram showing a transmitter including analog and digital beamformers. FIG. 14 is a diagram showing an antenna on/off structure for adjusting the beam width an analog beam bounded pattern.

In the case of the hybrid beamformer having the ULA structure of FIG. 13, the total number of RF chains is 4 and the number of physical antennas per RF chain is 4. At this time, in order to increase the beam width of the analog beam bounded pattern, the transmission end turns off two physical antennas per RF chain. At this time, since all power amplifiers may be changed, leading to transmit power loss, the power amplifiers may be included in the RF chain as shown in FIG. 14. That is, the structure of FIG. 14 may maintain the same transmit power regardless of ON/OFF of the physical antenna of the RF chain.

Figure 15:
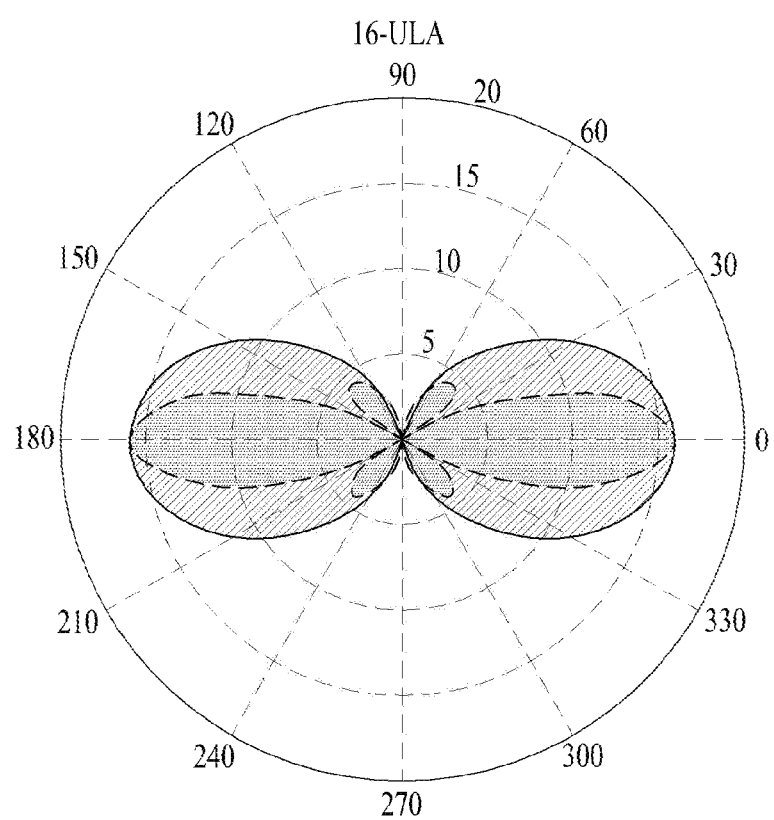
FIG. 15 is a diagram showing an analog beam bounded pattern, to which a physical antenna on/off scheme is applied.

FIG. 15 is a diagram showing an analog beam bounded pattern, to which a physical antenna on/off scheme is applied.

FIG. 15 shows the beam pattern when a signal is transmitted using only two physical antennas per RF chain in an actual 16-ULA physical antenna (4 RF chains and 4 physical antennas per RF chain) (beam pattern simulation result). As a result, it can be seen that the analog beam bounded pattern of the case where two physical antennas are used per RF chain (broad beam region) is broader than that of the case where four physical antennas are used per RF chain (narrow beam region). However, if two antennas are used per RF chain, the side lobe of a sharp beam may be severely generated to cause interference, thereby deteriorating performance.

2.3.2 Method of directly applying analog beam coefficient for forming broad beam in order to change analog beam boundary In the embodiment of the present invention, instead of beamforming through linear beam-shifting/beam-control, new irregular analog beamforming is performed. For example, the transmission end does not generate an elliptical beam by adjusting the analog beam coefficient, but may set an analog beam coefficient to have a specific pattern such that all beams are radiated in two directions or three directions.

Alternatively, the antenna structure of the transmission end may be changed to achieve the same object.

If a physical antenna is used, an analog beam bounded pattern may broaden. However, if two antennas are used per RF chain, the side lobe of a sharp beam may be severely generated, thus causing interference, thereby deteriorating performance.

The embodiments of the present invention were described in the hybrid beamforming structure. However, the embodiments of the present invention are applicable to the case where the analog beamforming stage shown in FIG. 5 is replaced with a digital beamforming stage. That is, the embodiments of the present invention are applicable to a digital beamforming structure having a hierarchical structure through antenna subgrouping.

In addition, although the embodiments of the present invention are described in a downlink scenario in which an eNB as a transmission end transmits a signal to a UE, the embodiments of the present invention are applicable to an uplink scenario in which a UE as a transmission end transmits a signal to an eNB.

The embodiments of the present invention are applicable to an arbitrary combination of a transmission end and a receiver. For example, the embodiments of the present invention are applicable to an uplink transmission scenario, a UE-to-UE signal transmission (D2D, V2V, etc.) scenario or an eNB-to-eNB signal transmission (relay, wireless backhaul, etc.) scenario.

3. Apparatus

Figure 16:
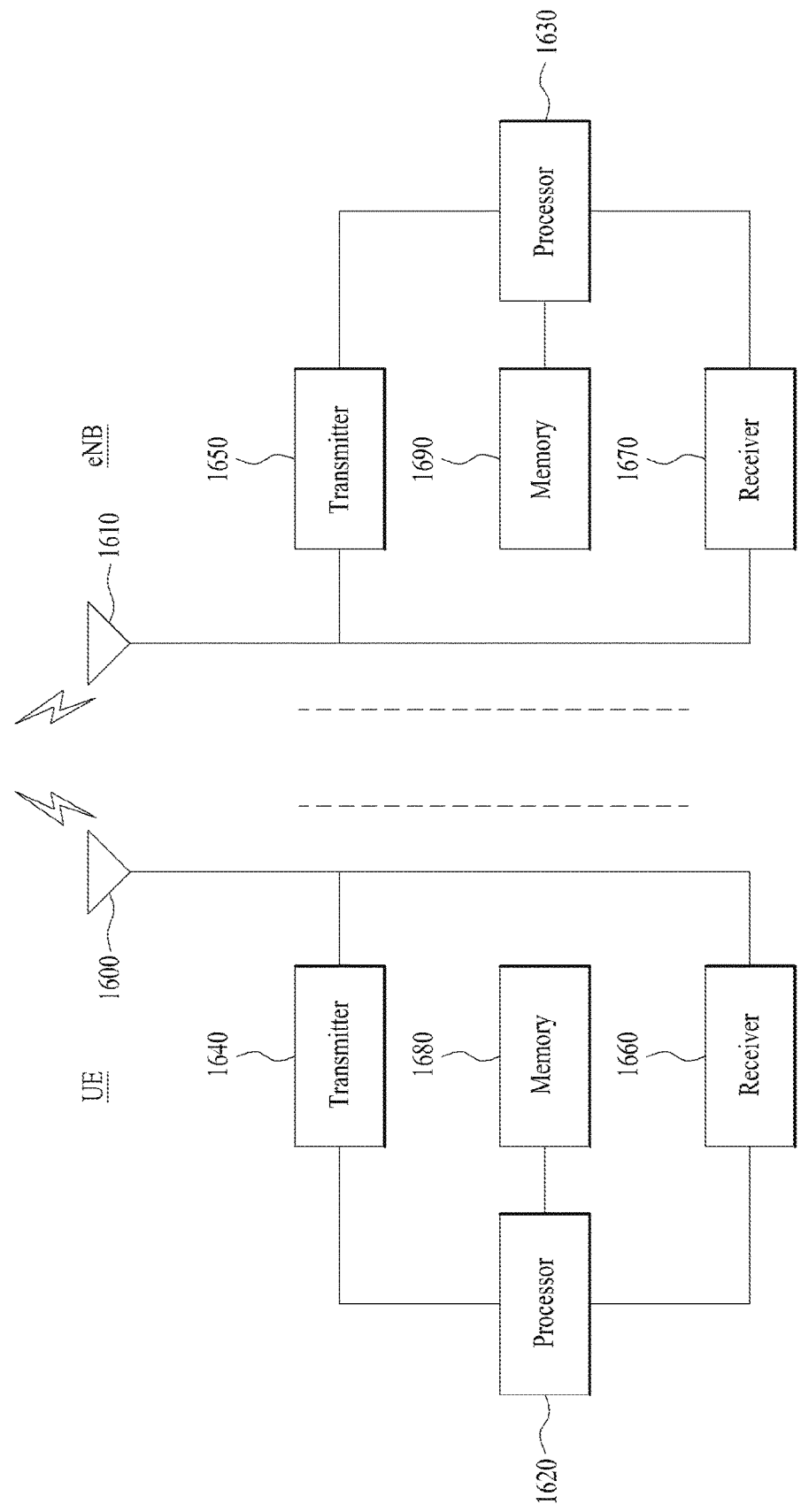
FIG. 16 is a diagram showing an apparatus for implementing the methods described with reference to FIGS. 1 to 15.

Apparatuses illustrated in FIG. 16 are means that can implement the methods described before with reference to FIGS. 1 to 15.

A UE may act as a transmission end on a UL and as a reception end on a DL. An eNB may act as a reception end on a UL and as a transmission end on a DL.

That is, each of the UE and the eNB may include a transmitter 1640 or 1650 and a receiver 1660 or 1670, for controlling transmission and reception of information, data, and/or messages, and an antenna 1600 or 1610 for transmitting and receiving information, data, and/or messages.

Each of the UE and the eNB may further include a processor 1620 or 1630 for implementing the afore-described embodiments of the present disclosure and a memory 1680 or 1690 for temporarily or permanently storing operations of the processor 1620 or 1630.

The embodiments of the present invention may be implemented using the components and functions of the UE and the eNB. In addition, each of the processors of the UE and the eNB may include an analog beamformer supporting analog beamforming and a digital beamformer supporting digital beamforming. Accordingly, the processor of the UE or the eNB may combine the methods described in Chapters 1 to 2 to apply a hybrid beamforming method for supporting multi-rank. For a detailed description thereof, refer to Chapters 1 and 2.

The transmitter and the receiver of the UE and the eNB may perform a packet modulation/demodulation function for data transmission, a high-speed packet channel coding function, OFDMA packet scheduling, TDD packet scheduling, and/or channelization. Each of the UE and the eNB of FIG. 16 may further include a low-power Radio Frequency (RF)/Intermediate Frequency (IF) module.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a hand-held PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

Embodiments of the present disclosure may be achieved by various means, for example, hardware, firmware, software, or a combination thereof.

In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present disclosure may be implemented in the form of a module, a procedure, a function, etc. performing the above-described functions or operations. A software code may be stored in the memory 1680 or 1690 and executed by the processor 1620 or 1630. The memory is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The present disclosure is applicable to various wireless access systems including a 3GPP system, a 3GPP2 system, and/or an IEEE 802.xx system. Besides these wireless access systems, the embodiments of the present disclosure are applicable to all technical fields in which the wireless access systems find their applications.

What is claimed:

1. A hybrid beamforming method for supporting multi-rank in a wireless access system, the method comprising:
   detecting, by a transmission end, two or more analog beam candidates having channel gain equal to or greater than a reference value;
   pre-compensating for analog beam coefficients of the two or more analog beam candidates such that one of the two or more analog beam candidates includes two or more digital beams;
   re-setting digital precoding matrix index (PMI) coefficient values of the two or more digital beams to apply the pre-compensated analog beam coefficients; and
   transmitting multi-rank signals using the pre-compensated analog beam coefficients and the re-set digital PMI coefficient values,
   wherein the hybrid beamforming operates using a combination of analog beamforming and digital beamforming.

2. The method according to claim 1,
   wherein the digital beamforming is performed in a digital stage using a baseband (BB) process, and wherein the analog beamforming is performed with respect to an analog signal generated from a digital signal subjected to the digital beamforming.

3. The method according to claim 1, wherein the number of multi-rank signals to be transmitted is determined according to the number of the two or more digital beams.

4. The method according to claim 1, wherein some of a plurality of physical antennas for the analog beamforming are turned off.

5. A transmission end for performing hybrid beamforming for supporting multi-rank in a wireless access system, the transmission end comprising:
- a transmitter;
- a receiver; and
- a processor configured to control the transmitter and the receiver to perform the hybrid beamforming,
- wherein the processor:
- controls the transmitter and the receiver to detect two or more analog beam candidates having channel gain equal to or greater than a reference value;
- pre-compensates for analog beam coefficients of the two or more analog beam candidates such that one of the two or more analog beam candidates includes two or more digital beams;
- re-sets digital precoding matrix index (PMI) coefficient values of the two or more digital beams to apply the pre-compensated analog beam coefficients; and
- controls the transmitter to transmit multi-rank signals using the pre-compensated analog beam coefficients and the re-set digital PMI coefficient values,
- wherein the hybrid beamforming operates using a combination of analog beamforming and digital beamforming.

6. The transmission end according to claim 5, wherein the processor includes an analog beamformer supporting the analog beamforming and a digital beamformer supporting the digital beamforming.

7. The transmission end according to claim 5,
- wherein the digital beamforming is performed in a digital stage using a baseband (BB) process, and
- wherein the analog beamforming is performed with respect to an analog signal generated from a digital signal subjected to the digital beamforming.

8. The transmission end according to claim 5, wherein the number of multi-rank signals to be transmitted is determined according to the number of the two or more digital beams.

9. The transmission end according to claim 5, wherein the processor turns some of a plurality of physical antennas for the analog beamforming off.

* * * * *